(12) United States Patent
Saurav

(10) Patent No.: US 8,977,966 B1
(45) Date of Patent: Mar. 10, 2015

(54) KEYBOARD NAVIGATION

(75) Inventor: Amit Saurav, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 69 days.

(21) Appl. No.: 13/172,567

(22) Filed: Jun. 29, 2011

(51) Int. Cl.
G06F 3/00 (2006.01)
G06F 3/048 (2013.01)
G06F 3/02 (2006.01)

(52) U.S. Cl.
USPC ............................ 715/738; 715/854; 345/172

(58) Field of Classification Search
CPC .......... G06F 17/30873; G06F 17/3089; G06F 3/04892; G06F 3/0489; G06F 3/0238
USPC .......... 715/738, 854, 827, 788, 767; 345/172, 345/178
See application file for complete search history.

(56) References Cited

U.S. PATENT DOCUMENTS

| | | | | |
|---|---|---|---|---|
| 6,029,135 | A * | 2/2000 | Krasle ............................ | 704/275 |
| 6,199,125 | B1 * | 3/2001 | Cortesi ............................ | 710/67 |
| 6,523,061 | B1 * | 2/2003 | Halverson et al. ............ | 709/202 |
| 6,651,084 | B1 * | 11/2003 | Kelley et al. .................. | 709/202 |
| 6,907,577 | B2 * | 6/2005 | Tervo ............................ | 715/827 |
| 7,441,207 | B2 * | 10/2008 | Filner et al. ................... | 715/864 |
| 7,552,400 | B1 * | 6/2009 | Sriver et al. .................. | 715/827 |
| 2002/0023271 | A1 * | 2/2002 | Augenbraun et al. ........ | 725/109 |
| 2002/0070961 | A1 * | 6/2002 | Xu et al. ........................ | 345/738 |
| 2002/0070962 | A1 * | 6/2002 | Van Doorselaer et al. ... | 345/738 |
| 2002/0126153 | A1 * | 9/2002 | Withers et al. ................ | 345/773 |
| 2002/0156870 | A1 * | 10/2002 | Boroumand et al. ......... | 709/219 |
| 2002/0190946 | A1 * | 12/2002 | Metzger ........................ | 345/156 |
| 2003/0018474 | A1 * | 1/2003 | Chavan ......................... | 704/270 |
| 2006/0117271 | A1 * | 6/2006 | Keim ............................. | 715/789 |
| 2006/0206832 | A1 * | 9/2006 | Celik et al. ................... | 715/767 |
| 2006/0206912 | A1 * | 9/2006 | Klarfeld et al. ................ | 725/40 |
| 2006/0212824 | A1 * | 9/2006 | Edenbrandt ................... | 715/788 |
| 2007/0055655 | A1 * | 3/2007 | Bernstein et al. ................ | 707/3 |
| 2007/0067741 | A1 * | 3/2007 | Spisak .......................... | 715/827 |
| 2008/0028434 | A1 * | 1/2008 | Drazin ......................... | 725/134 |
| 2009/0049388 | A1 * | 2/2009 | Taib et al. .................... | 715/738 |
| 2009/0313581 | A1 * | 12/2009 | Martin ......................... | 715/827 |
| 2011/0265035 | A1 * | 10/2011 | Lepage et al. ................ | 715/810 |

OTHER PUBLICATIONS

Curtis D. Frye, "Microsoft Excel 2010 Plain & Simple", Jun. 23, 2010, Microsoft Press, p. 31.*

(Continued)

*Primary Examiner* — Kieu Vu
*Assistant Examiner* — Asteway T Gattew
(74) *Attorney, Agent, or Firm* — Novak Druce Connolly Bove + Quigg LLP

(57) ABSTRACT

Systems and methods in accordance with various embodiments of the present disclosure enable use of a keyboard to navigate a webpage presented in a web browser. According to an embodiment, a two-dimensional grid is placed over a webpage and elements of the webpage are assigned to the nearest cells of the grid. The grid specifies the directional and distance relations among the various elements of the webpage. Functionality is provided that enables users to quickly navigate the elements of the webpage using arrow keys of a keyboard. For example, if a selection indicator is currently focused on a webpage element that is assigned to a particular cell of the grid, a press of the left-arrow key moves the selection indicator leftward along the grid to the element that is assigned to the nearest leftward cell. The same functionality is applied to up-arrow, down-arrow, and right-arrow keys. Further, functionality is provided that enables users to quickly navigate the elements of the webpage using hotkeys.

24 Claims, 14 Drawing Sheets

(56) References Cited

OTHER PUBLICATIONS

"Plug-in (computing)," Aug. 25, 2008, wikipedia.org, pp. 1-4.*

Rick Broida, "Navigate Web Forms Faster by Using the Tab Key," Jul. 12, 2010, pcworld.com, pp. 1-6.*

"Navigate with the Tab Key," Feb. 1, 2009, lynnparkplace.com, p. 1.*

\* cited by examiner

KEYBOARD NAVIGATION

BACKGROUND

Web browsers are software applications used for retrieving and viewing information resources on the World Wide Web and private networks. The information resources may be, for example, webpages that contain numerous types of content, such as text, static images, animated images, audio, and video content. Further, web browsers enable end users to interact with content, such as "click to play" videos, radio buttons, dropdown menus, popup dialog boxes, textboxes, and hyperlinks. User interaction typically involves the use of a pointing device, which is an input device that enables an end user to input data via physical gestures, such as pointing, clicking, and dragging. Example pointing devices include mice, trackballs, joysticks, and styluses. User movements of the pointing device are echoed by movements of a pointer or cursor across the content presented on the webpage. For example, when using a pointing device to interact with the content of a webpage, an end user may move the pointing device in a manner that causes a cursor to be positioned over a hyperlink, and then the end user may select the hyperlink by clicking a button on the pointing device.

Although useful, pointing devices have some disadvantages. For example, older operating systems, such as Linux®, may not support the use of pointing devices. Also, pointing devices are not always available because pointing devices are easily lost or broken. Further, operation of pointing devices may sometimes be inefficient because end users may be required to remove a hand from the keyboard, reach for the pointing device, operate the pointing device, and then place their hand back on the keyboard in the appropriate position.

DETAILED DESCRIPTION

Systems and methods in accordance with various embodiments of the present disclosure may overcome one or more of the aforementioned and other deficiencies experienced in conventional approaches to navigating webpages. In particular, various approaches enable the use of a keyboard to navigate a webpage presented in a web browser. According to an embodiment, a two-dimensional grid is placed over a webpage and elements of the webpage are assigned to the nearest cells of the grid. The grid specifies the directional and distance relations among the various elements of the webpage. Functionality is provided that enables users to quickly navigate the elements of the webpage using arrow keys of a keyboard. For example, if a selection indicator is currently focused on a webpage element that is assigned to a particular cell of the grid, a press of the left-arrow key moves the selection indicator leftward along the grid to the element that is assigned to the nearest leftward cell. The same functionality is applied to up-arrow, down-arrow, and right-arrow keys. Further, functionality is provided that enables users to quickly navigate the elements of the webpage using hotkeys. For example, the "T" key of the keyboard may be assigned to the textbox elements of the webpage. Thus, according to this example, a press of the "H" key causes the selection indicator to move from a current element to the textbox element assigned to the nearest cell in the grid. The same functionality may be applied to other hotkeys. For example, pressing the "A" key may move the selection indictor to the nearest anchor element, pressing the "H" key would move the selection indicator to the nearest header element, etc.

Figure 1:
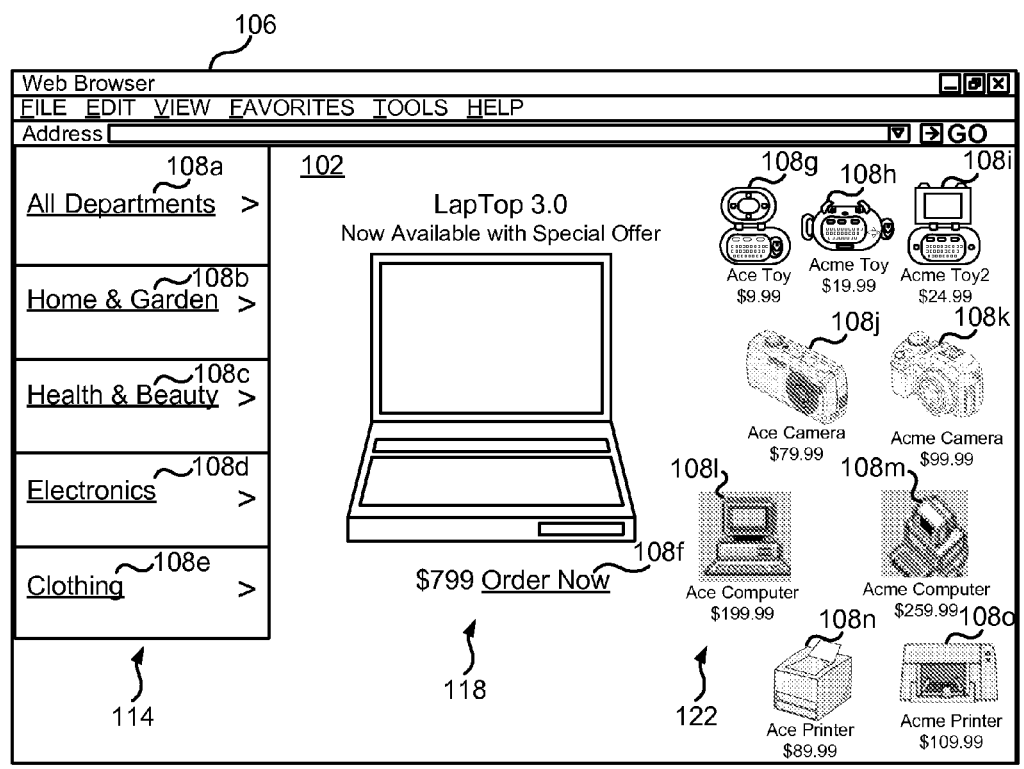
FIG. 1 illustrates an example webpage presented in an example web browser, in accordance with various embodiments.

FIG. 1 illustrates an example webpage 102 presented in an example web browser 106, in accordance with various embodiments. The example webpage 102 includes a plurality of elements 108*a-o*. According to the illustrated embodiment, the elements 108*a-o* are HTML elements, such as HTML anchor elements that anchor hyperlinks to other webpages. However, it should be appreciated that the elements 108*a-o* could be any type of component or information. For example, the elements could be static or interactive text, static or animated images, audio, video, radio buttons, search boxes, dropdown menus, forms, etc. Elements 108*a*-108*e* are provided in a search navigation panel 114, element 108*f* is provided in a buy now panel 118, and elements 108*g*-108*o* are provided in a search results panel 122.

Figure 2:
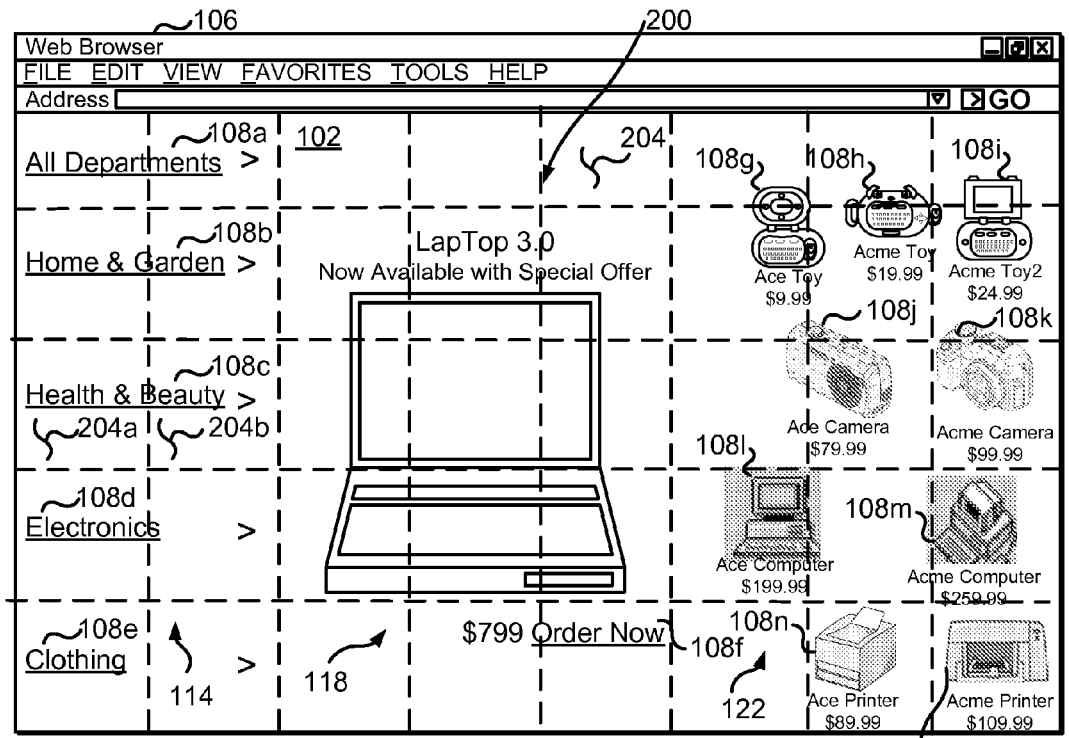
FIG. 2 illustrates an example two-dimensional grid placed over the example webpage of FIG. 1, in accordance with various embodiments.

FIG. 2 illustrates an example two-dimensional grid 200 placed over the example webpage 102 of FIG. 1, in accordance with various embodiments. As illustrated, the grid 200 is divided into a plurality of cells 204. The grid 200 may be configured such that each of the cells 204 in the grid 200 has the same dimensions. However, it should be appreciated that the grid 200 could be dynamically generated such that the individual cells 204 are uniquely sized to correspond with the individual sizes of the elements 108a-o. According to an embodiment, a client-side script is embedded in the webpage 102. When executed by the web browser 106, the script overlays the grid 200 on the webpage 102. According to another embodiment, the web browser 106 includes a plug-in, extension, or other type of suitable software component that overlays the grid 200 on the webpage 102.

Figure 3:
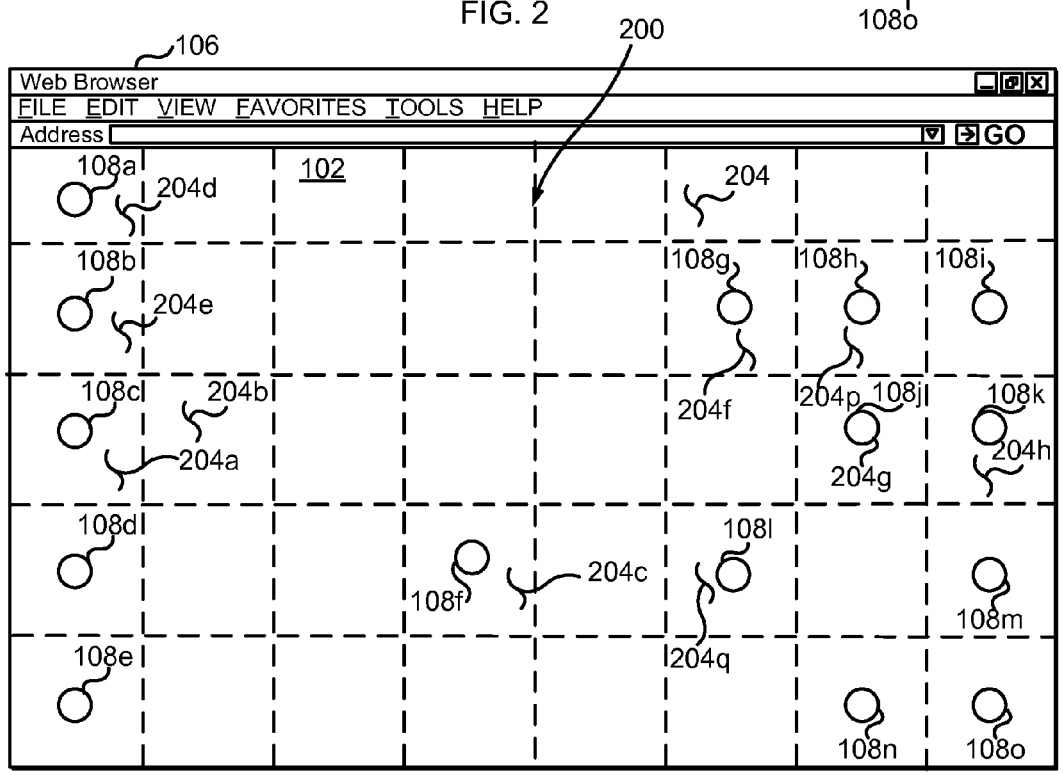
FIG. 3 schematically illustrates elements of the example webpage of FIG. 1 being assigned to the nearest cells of the two-dimensional grid of FIG. 2, in accordance with various embodiments.

FIG. 3 schematically illustrates the elements 108a-o of the example webpage 102 of FIG. 1 being assigned to the nearest cells 204 of the two-dimensional grid 200 of FIG. 2, in accordance with various embodiments. According to an embodiment, the client-side script or browser plug-in assigns each of the elements 108a-o to the nearest one of the cells 204 of the grid 200. According to an embodiment, the individual elements 108a-o are assigned to a single cell 204 even though one or more of the elements 108a-o extend across multiple cells 204. For example, with reference to FIGS. 2 and 3, the "Health & Beauty" element 108c is assigned to cell 204a even though the element 108c is located in both to cells 204a and 204b. Likewise, for example, the "Order Now" element 108f is assigned to cell 204c even though the element 108f covers multiple cells.

Figure 4:
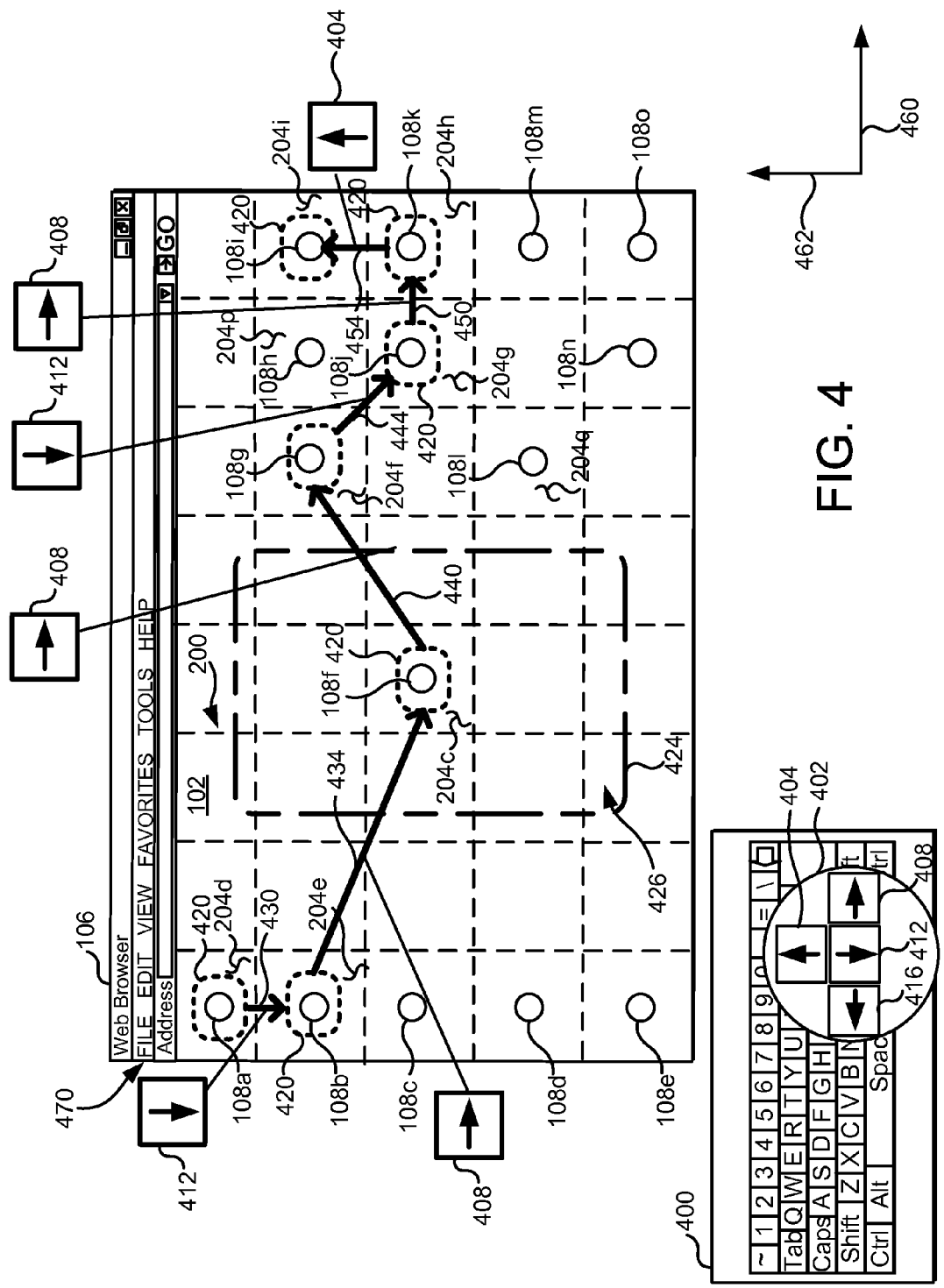
FIG. 4 schematically illustrates using directional inputs from a keyboard to navigate elements of the example webpage of FIG. 1, in accordance with various embodiments.
Figure 5:
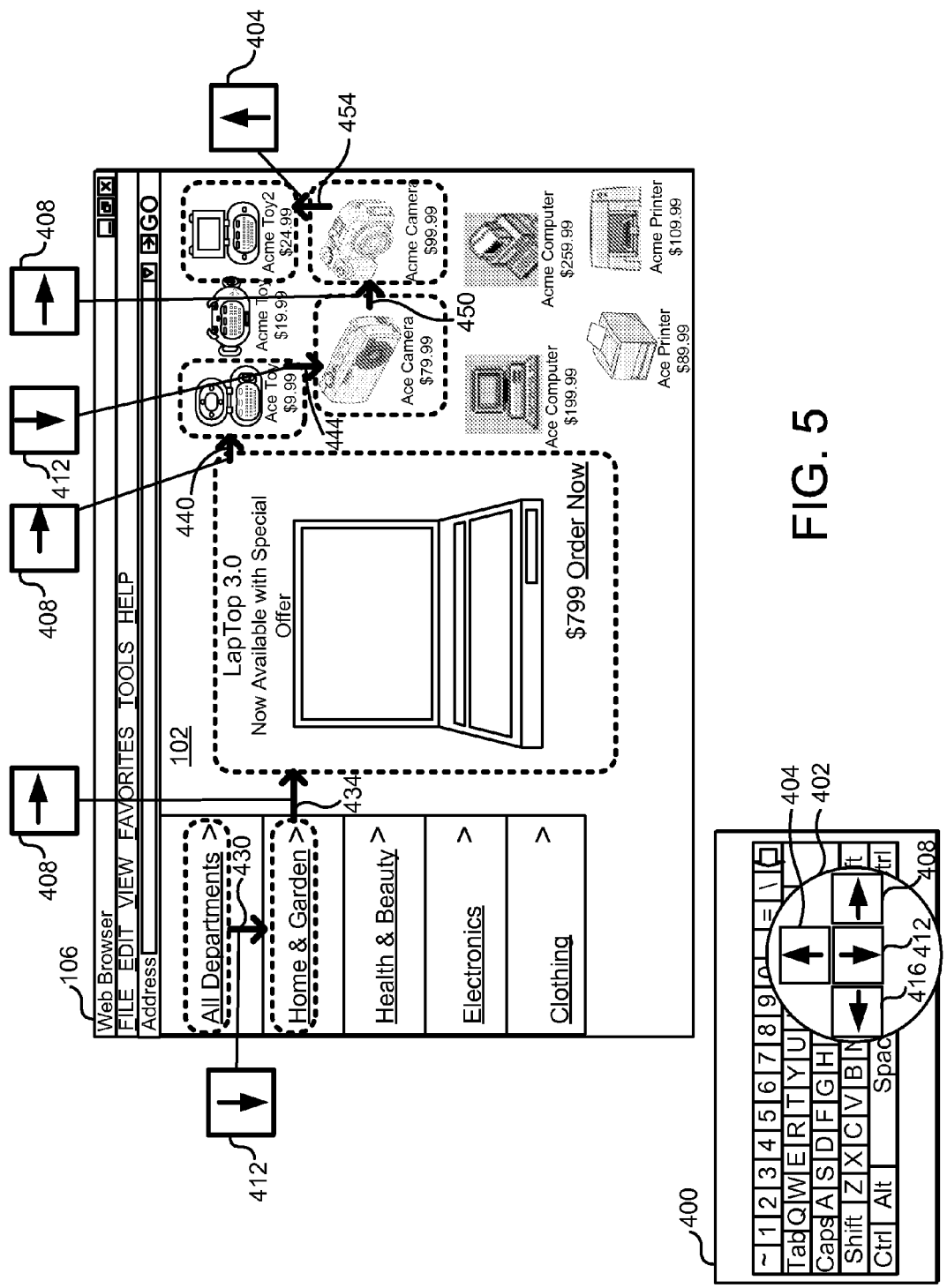
FIG. 5 illustrates using directional inputs from a keyboard to navigate elements of the example webpage of FIG. 1, in accordance with various embodiments.

FIGS. 4 and 5 illustrate using directional inputs from arrow keys 402 of a keyboard 400 to navigate elements 108 of the example webpage 102 of FIG. 1, in accordance with various embodiments. According to the illustrated embodiment, directional arrows 404, 408, 412, and 416 of the keyboard 400 function to move a selection indicator 420 between the elements 108a-o of the webpage 102.

As illustrated at arrow 430, pressing the down-arrow key 412 moves the selection indicator 420 from element 108a downward in the grid 200 to the element 108b of the cell 204e, which is the closest of the cells 204 in the downward direction to the cell 204d from which the selection indicator 420 is being moved.

Continuing with the example illustrated at arrow 430, according to an embodiment, pressing the down-arrow key 412 sends a directional command from the keyboard 400 to the web browser 106 and, in response to the directional command, a client-side script running on the webpage 102 or a software component of the web browser 106 moves the selection indicator 420 from element 108a to element 108b, which is assigned to the cell 204e that is located nearest, in the downward direction specified by the downward-arrow key 412, to the element 108a from which the selection indicator 420 is being moved. In operation, for example, upon receiving the directional command caused by pressing the down-arrow key 412, the client-side script or software component identifies the nearest directional cell and then moves the selection indicator 420 to that cell. As already discussed, the nearest directional cell is the cell 204e, which is located in the direction of the directional command nearest to the cell 204d of the element 108a from which the selection indicator 420 is being moved. It should be appreciated that, instead of identifying the nearest cell and then moving the selection indicator 420 to that cell, embodiments could move the selection indicator 420 to the nearest element, irrespective of the grid.

As illustrated at arrow 434, pressing the right-arrow key 408, when the selection indicator 420 is on element 108b, causes the selection indicator 420 to move to the element 108f of cell 204c, which is the closest cell that has one of the elements 108a-o assigned thereto. More specifically, cell 204c is the closest cell because it is located nearest, in the horizontal direction 460 indicated by the right-arrow key 408, to the cell 204e of element 108b from which the selection indicator 420 is being moved. It should be noted that the selection indicator 420 skips cells 204 located between cells 204e and 204c because those cells 204 do not possess one of the elements 108a-o.

In some instances, elements 108 bleed into multiple cells 204. Such an instance is illustrated in FIGS. 4 and 5, where the element 108f covers multiple cells 204. Box 424 of FIG. 4 illustrates the coverage of the element 108f. As illustrated, the box 424 encloses a group of cells 426 that the element 108f covers. These instances where a single element (e.g., element 1080 covers a group of cells (e.g., group 426) may sometimes create situations where two or more cells 204 tie for being the nearest cells to the cell of the element 108 (e.g., element 108f) from which the selection indicator 420 is being moved. For example, as illustrated in FIG. 4, cells 204f and 204q are located the same distance along the horizontal axis 460 from the group of cells 426. Here, the script running on the webpage 102 or the software component of the web browser 106 decides on the fly which of the cells 204f and 204q is the most intuitive location for a user and then moves the selection indicator 420 to that cell.

According to an embodiment, the script or software component is programmed to determine that the cell 204 that is located highest in the grid 200 in vertical direction 462 is the most intuitive. Thus, the selection indicator 420 is moved to the element 180g of the cell 204f because it is higher in the grid 200 relative to the vertical axis 462 than cell 204q. Accordingly, as illustrated at arrow 440, pressing the right-arrow key 408 when the selection indicator 420 is on element 108f causes the selection indicator 420 to move to the element 108g of cell 204f because cell 204f: (1) has an element 108a-o assigned thereto; (2) is tied with cell 204q for being the cell located, in the horizontal direction 460 indicated by the right-arrow key 408, nearest to the group of cells 426 within box 424 that are covered by the element 108f from which the selection indicator 420 is being moved; and (3) is located higher in the grid 200 relative to the vertical axis 462 and is therefore more intuitive than cell 204q.

It should be appreciated that in instances where the selection indicator 420 is being moved along the vertical axis 462 in response to a user pressing the up arrow 404 or down arrow 412 (as opposed to the above example where the selection indicator 420 is being moved along the horizontal axis 460) and two or more cells 204 tie for being the nearest cells, the script or software component is configured to determine that the cell located farthest to the left along the horizontal axis 460 in the grid 200 is considered to be the most intuitive. Thus, in these situations, the selection indicator 420 is moved to the cell 204 that is farthest to the left.

It should also be appreciated that the examples provided herein regarding determining which cells 204 are most intuitive in situations where two or more cells tie for being the closest cells relative to an element that covers a group of cells are not intended to be limiting. Thus, it should be appreciated that, when moving the selection indicator 420 in a horizontal direction, the most intuitive element may be the element assigned to the cell that is most in line with the group of cells covered by the element from which the selection indicator is being moved. It should also be appreciated that the most intuitive element may be the element assigned to the cell that is lowest in the grid 200 along the vertical axis 462. Further, it should be appreciated that, when moving the selection indicator in a vertical direction, that the most intuitive element may be the element assigned to the cell that is most in line with the group cells covered by the element from which the selection indicator is being moved. It should also be appreciated that, when moving vertically, the most intuitive element may be the element assigned to the cell that is farthest to the right (rather than the element farthest to the left) in the grid 200 along the horizontal axis 460.

Arrow 444 illustrates that, according to an embodiment, both vertical and horizontal distances are considered when moving the selection indicator 420 to the nearest element 108*a-o*. Here, in response to a user pressing the down-arrow key 412, the selection indicator 420 moves from element 108*g* to element 108*j* even though 108*h* is assigned to the nearest cell 204*p* and even though 108*f* is assigned to a cell 204*c* that is located the same vertical distance from element 108*g* as cell 204*g*. In this example, the selection indicator 420 is not moved to 108*h* even though its cell 204*p* is nearest to element 108*g* because the user pressed the downward arrow key 412 and cell 204*p* is not located downward from element 108*g*. Further, even though cell 204*c* and cell 204*g* are the same vertical distance from 108*g*, cell 204*g* is considered the nearest cell for purposes of this example because it is horizontally nearer to element 108*g* than cell 204*c*. Thus, according to this example, both horizontal and vertical distances are considered when determining the nearest cell.

As illustrated at arrow 450, pressing the right-arrow key 408 moves the selection indicator 420 from element 108*j* rightward along the horizontal axis 460 of the grid 200 to the element 108*k* of the cell 204*h*, which is the closest of the cells 204 in the rightward direction to the cell 204*g* from which the selection indicator 420 is being moved. Further, as illustrated at arrow 454, pressing the up-arrow key 404 moves the selection indicator 420 from element 108*k* upward along the vertical axis 462 of the grid 200 to the element 108*i* of the cell 204*i*, which is the closest of the cells 204 in the upward direction to the cell 204*h* from which the selection indicator 420 is being moved.

Figure 6:
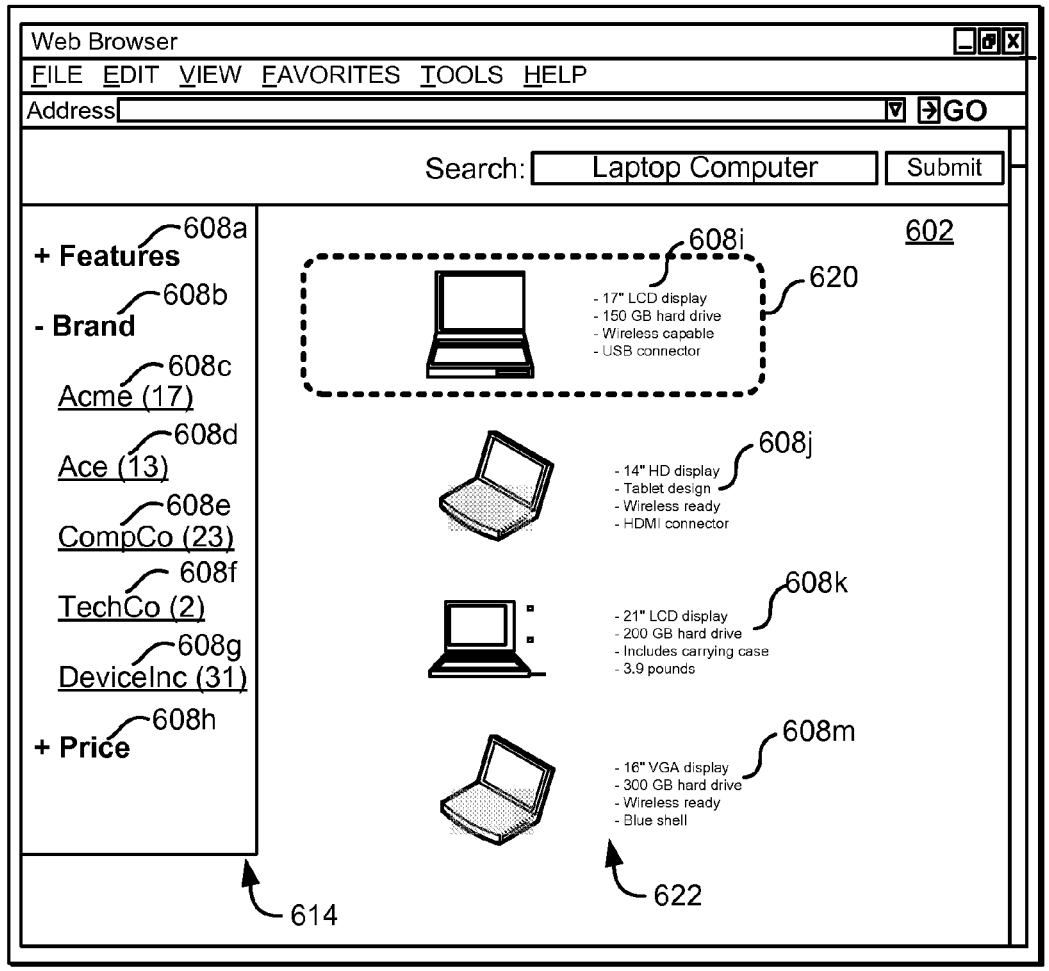
FIG. 6 illustrates using hotkey inputs from a keyboard to navigate elements of an example webpage, in accordance with various embodiments.
Figure 6:
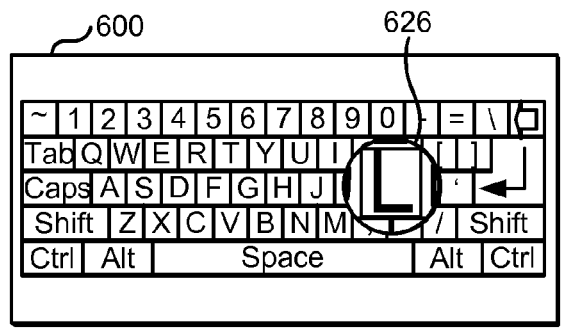
Figure 7:
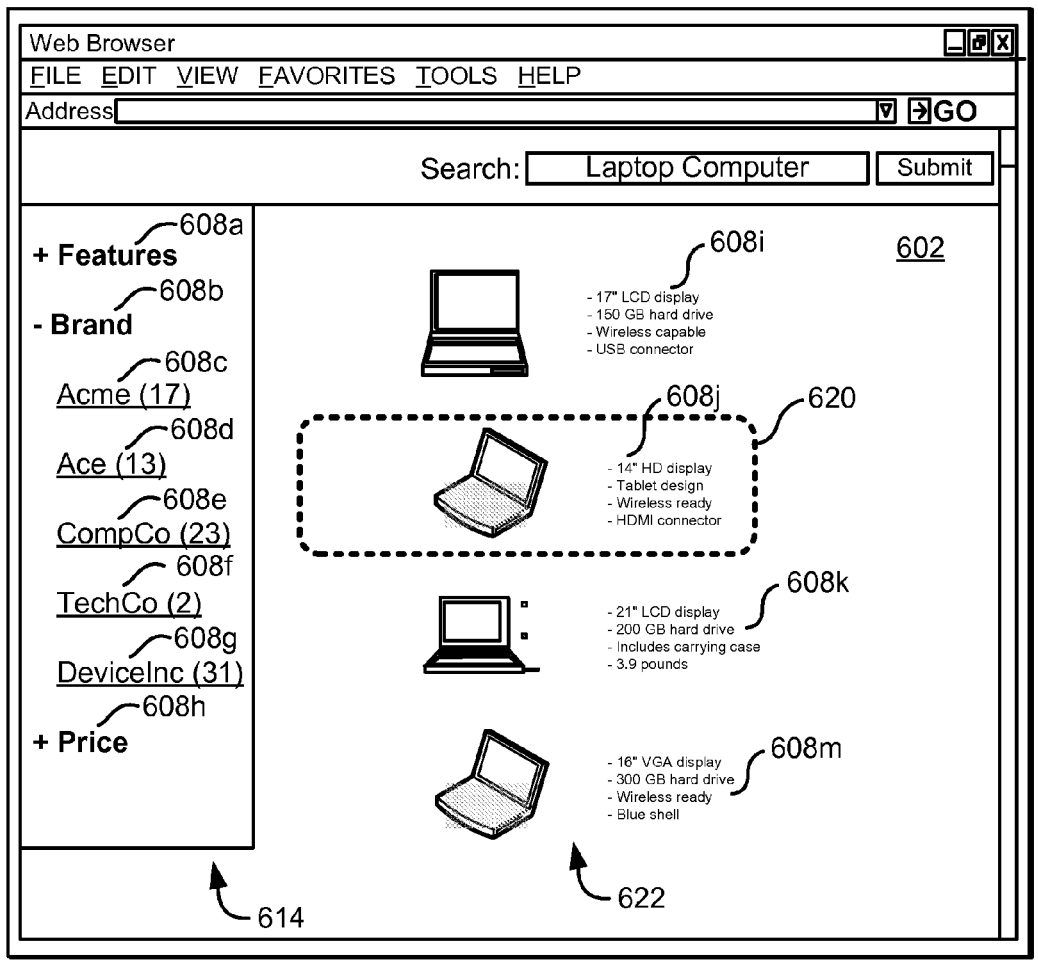
FIG. 7 illustrates using hotkey inputs from a keyboard to navigate elements of an example webpage, in accordance with various embodiments.
Figure 7:
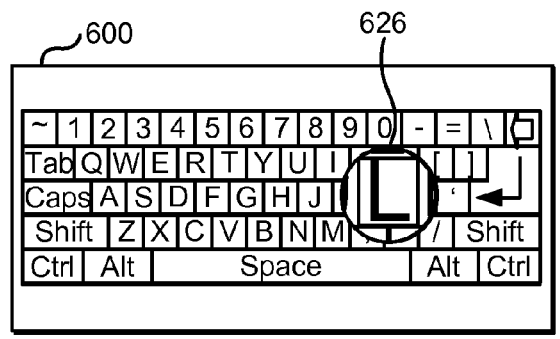

FIGS. 6-11 illustrate using hotkey inputs from a keyboard 600 to navigate elements 608*a-m* of an example webpage 602, in accordance with various embodiments. Elements 608*a*-608*h* are provided in a search navigation panel 614 and elements 608*i*-608*m* are provided in a search results panel 622. Elements 608*i*-608*m* may correspond with a list of search results presented in the search results panel 622. As illustrated in FIG. 6, when a user presses the "L" key 626 of the keyboard 600, a selection element 620 is applied to the top element 608*i* in the list of search results provided in the search results panel 622. As illustrated in FIG. 7, when the user presses the "L" key 626 second time, the selection element 620 is moved downward from the top element 608*i* to the element 608*j*, which is the second of the search results. It should be appreciated that with each tap of the "L" key 626 the selection indicator 620 moves the nearest element 608 in a manner similar to the movement of the selection indicator 420 described with reference to FIGS. 1-5.

Figure 8:
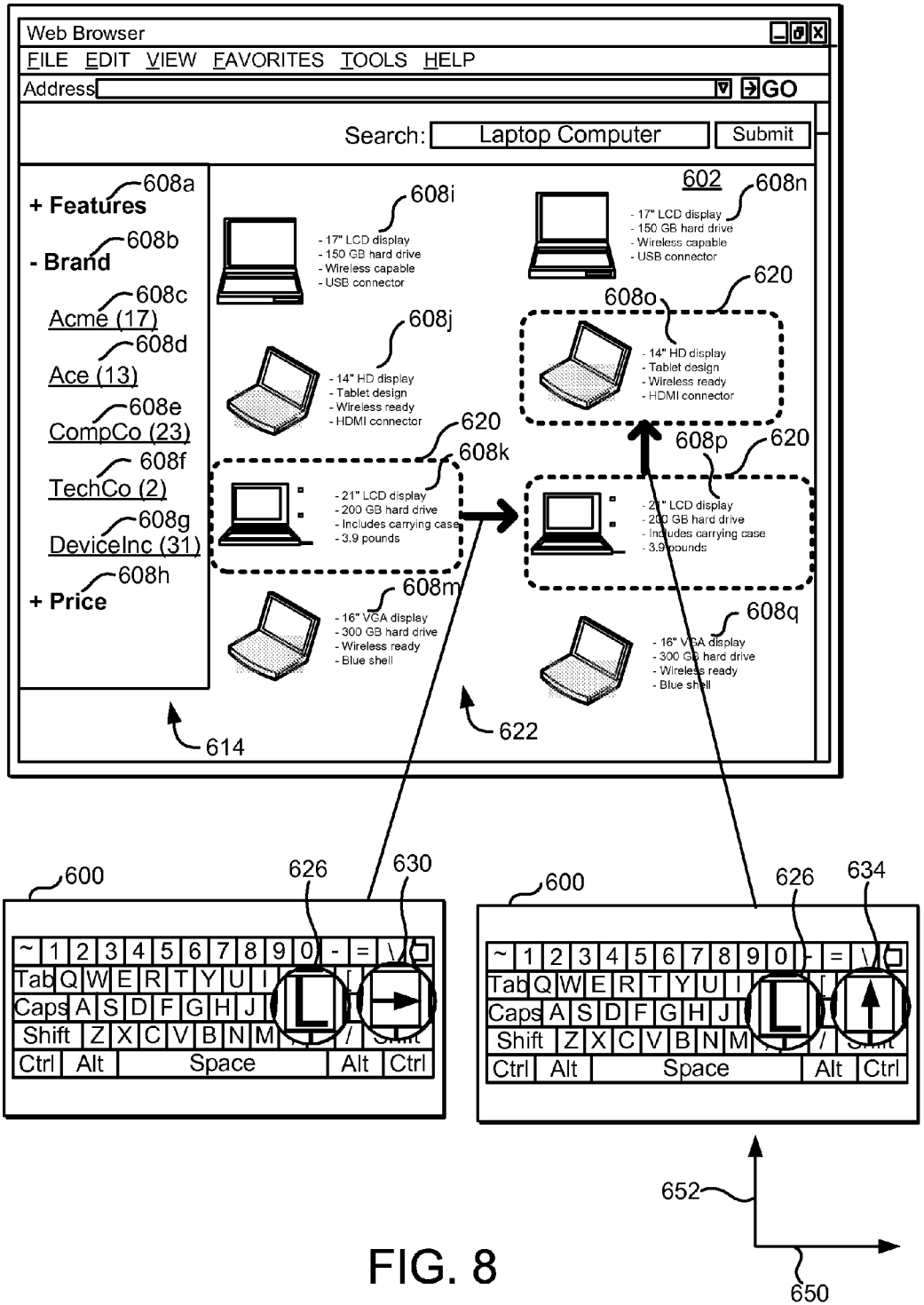
FIG. 8 illustrates using a combination of directional and hotkey inputs from a keyboard to navigate elements of an example webpage, in accordance with various embodiments.

FIG. 8 illustrates the webpage 602 of FIG. 6. However, the webpage 602 of FIG. 8 includes an additional column of elements 608*n*-608*q* in the search result panel 622. According to an embodiment, if a user taps the "L" key 626 three times, the selection indicator 620 will be focused on element 608*k*. The user can tap the "L" key 626 three more times and the selection indicator 620 will be focused on element 608*o*. However, instead of tapping the "L" key 626 three more times, the user may hold down the "L" key 626 and then press the right-arrow key 630 and cause the selection indicator 620 to move rightward along the horizontal axis 650 to the element 608*p*. Once on the element 608*p*, the user can hold down the "L" key 626 and then press the up-arrow key 634 and cause the selection indicator 620 to move upward along the vertical axis 652 to the element 608*o*. It should be appreciated that holding down the "L" key 626 and then pressing the left-arrow and down-arrow keys will cause similar movement of the selection indicator 620. Further, it should be appreciated, that when the selection indicator is applied to element 608*k*, if the user were to hold down the "L" key 626 and then press the left-arrow key, the selection indicator 620 would not move leftward along the horizontal axis 650 to the element 608*f* or 608*g* because those elements are not on the search results panel 622 and are therefore not assigned to hotkey "L". For example, user would have to use a different hotkey, such as "N", to move the selection indicator 620 to one of the elements 608*a*-60*h* of the navigation panel 614.

Figure 9:
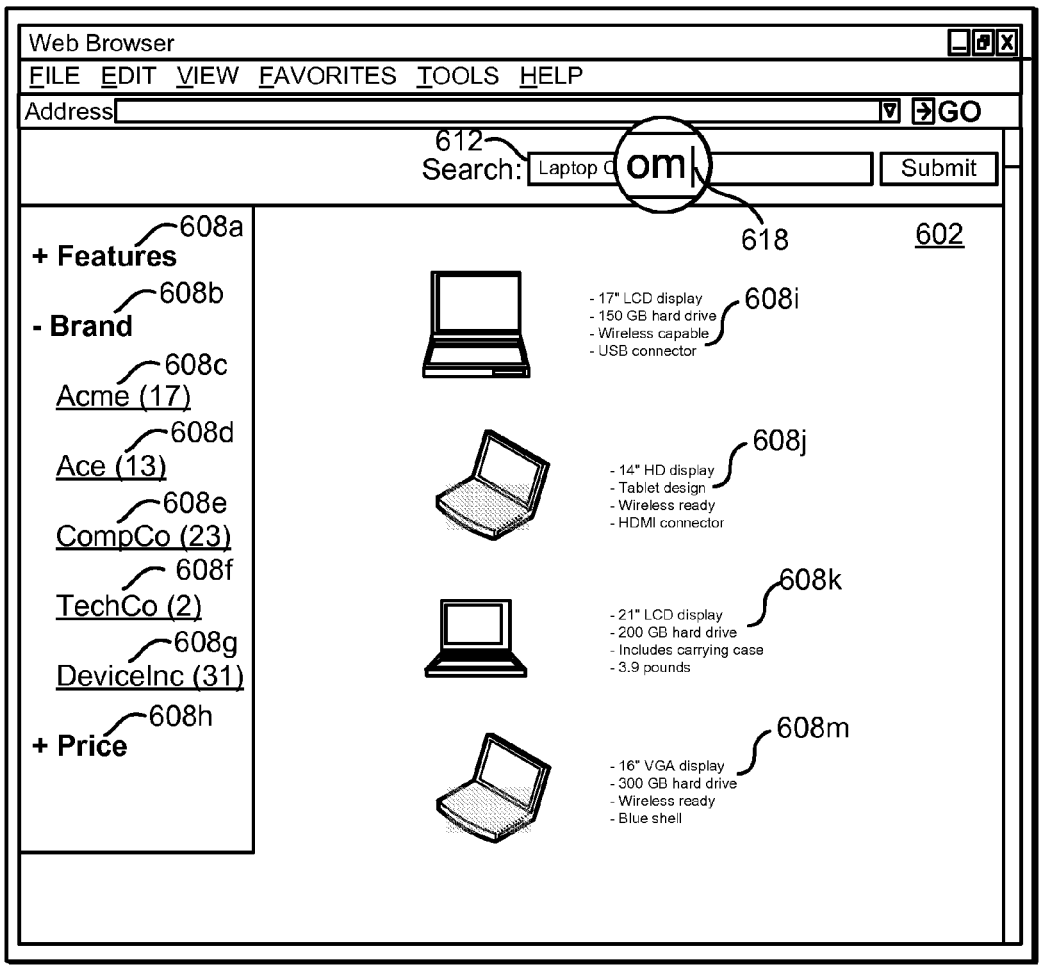
FIG. 9 illustrates using hotkey inputs from a keyboard to navigate elements of an example webpage, in accordance with various embodiments.
Figure 9:
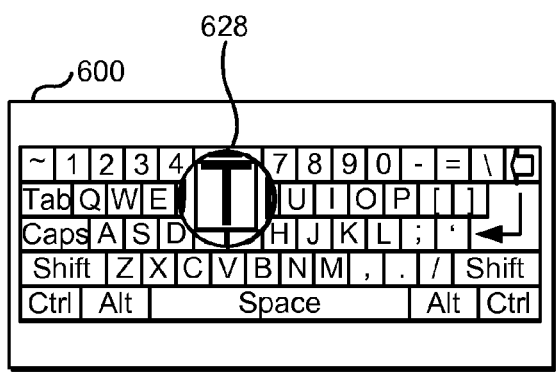

As illustrated in FIG. 9, the webpage 602 includes a textbox 612, which is a search input box. Further, as illustrated in FIG. 9, if a user presses the "T" key 628 of the keyboard 600, the cursor 618 will become active in the textbox 612. If more than one textbox is provided on the webpage 602, the cursor 618 will move to the nearest textbox if the user presses the "T" key 628 a second time. After the cursor is activated in the textbox, the arrow keys of the keyboard may be used to move the selection indicator among the elements of the webpage 602.

Figure 10:
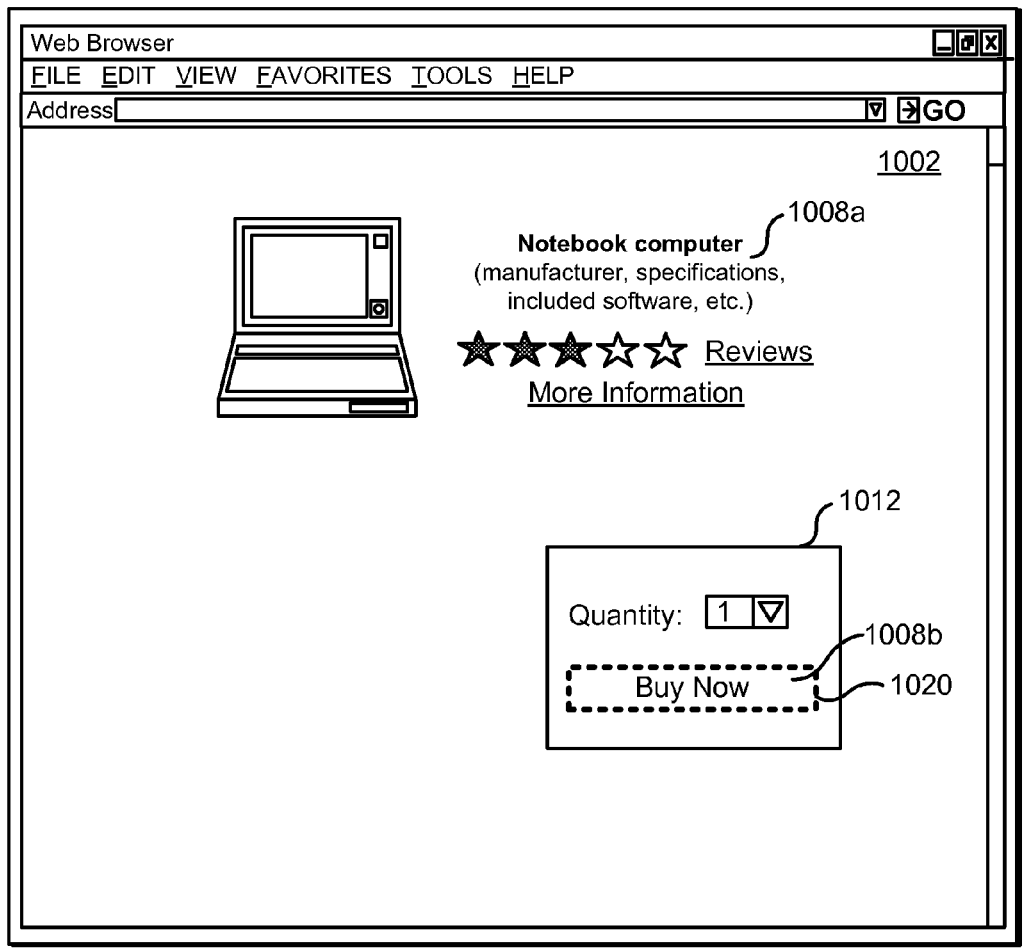
FIG. 10 illustrates using hotkey inputs from a keyboard to navigate elements of an example webpage, in accordance with various embodiments.
Figure 10:
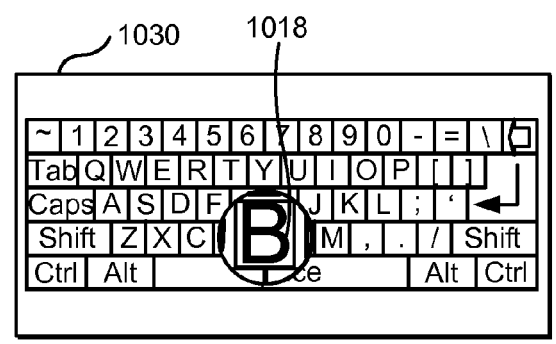

FIG. 10 illustrates an example webpage 1002 having elements 1008*a-b*, where element 1008*a* is an item for sale and element 1008*b* is a "buy now" icon in a buy box 1012. As illustrated, pressing a "B" key 1018 of the keyboard 1030 will focus a selection element 1020 on the "buy now" element 1008*b*. Thus, instead of mousing to and then clicking on the "buy now" icon, a user may simply press the "B" key 1018 of the keyboard 1030 and then activate the element 1008*b* by pressing the return or enter key on the keyboard 1030, for example.

Figure 11:
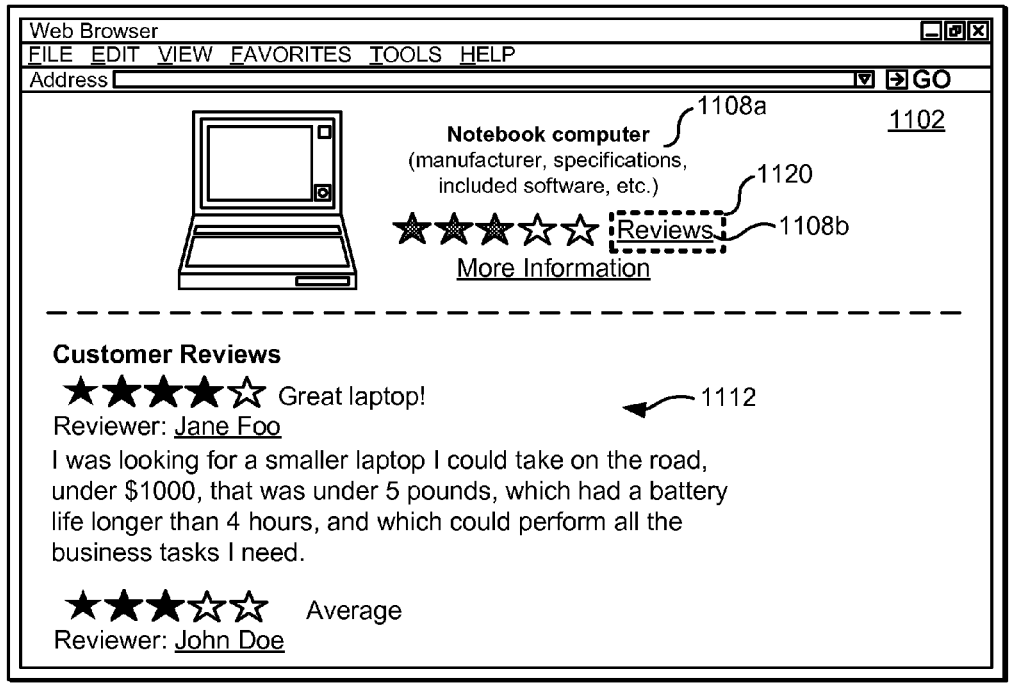
FIG. 11 illustrates using hotkey inputs from a keyboard to navigate elements of an example webpage, in accordance with various embodiments.
Figure 11:
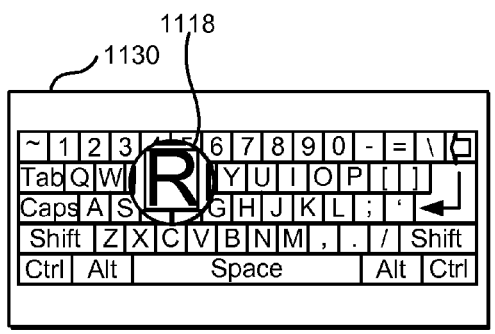

FIG. 11 illustrates an example webpage 1102 having an elements 1108*a-b*, where element 1108*a* is an item for sale and element 1108*b* is a "Review" icon that causes consumer reviews 1112 to be displayed. As illustrated, pressing an "R" key 1118 of the keyboard 1130 will focus a selection element 1120 on the "Review" element 1108*b*. Thus, instead of mousing to and then clicking on the "Review" icon, a user may simply press the "R" key 1118 of the keyboard 1130 and then activate the "Review" element 1108*b* by pressing the return or enter key on the keyboard 1030, for example.

Figure 12:
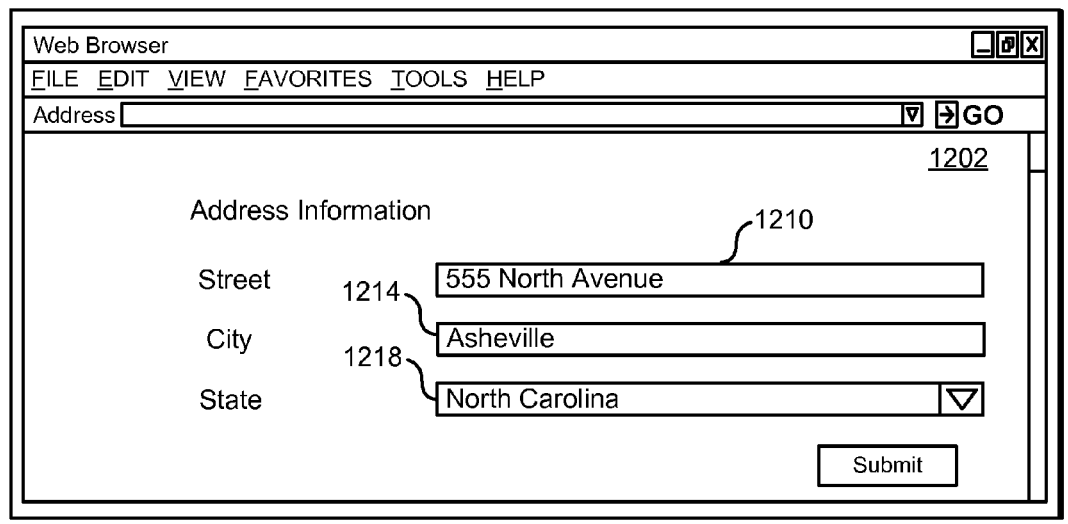
FIG. 12 illustrates using audible inputs from a microphone to input text and select items from a dropdown menu, in accordance with various embodiments.

FIG. 12 illustrates an example webpage 1202 having textboxes 1210, 1214, and 1218, where textbox 1218 is associated with a dropdown menu. According to an embodiment, a user may input audible commands via a microphone attached to a computer device that displays the webpage 1202. These audible commands may be provided in combination with hotkey and directional commands from a keyboard. For example, a user may press the "T" key of the keyboard to move a cursor to textbox 1210 into which the user may input street address information. Once the cursor is in textbox 1210, the user may say the address information into the microphone. A software component of the computer may translate the audible input received from the microphone into text and fill out the textbox 1210 with the text. After inputting street address information, the user may press the "T" key of the keyboard and cause the cursor to move to textbox 1214. Once there, the user may say the city information into the microphone and thereby cause the city information to be inputted into the textbox 1214. After inputting street address information, the user may press the "T" key of the keyboard and cause the cursor to move to textbox 1218, thereby causing the dropdown menu to appear with a list of the fifty states. The user may say the name of the appropriate state into the microphone, thereby causing the textbox 1218 to be completed with the appropriate state information.

Figure 13:
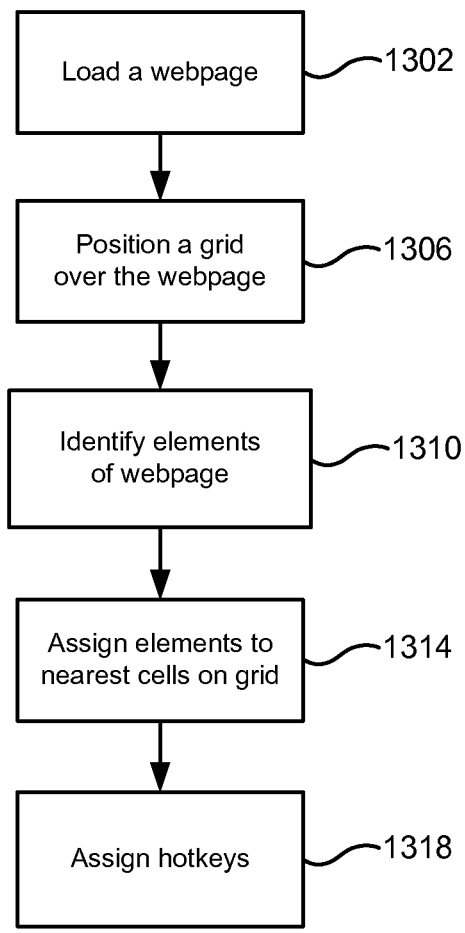
FIG. 13 illustrates an example process of configuring a webpage for keyboard navigation, in accordance with various embodiments.

FIG. 13 illustrates an example process 1300 of configuring a webpage for keyboard navigation, in accordance with various embodiments. At 1302, the process 1300 generally begins with loading a webpage. For example, according to 1302, the webpage 102 of FIG. 1 is loaded by the web browser 106. At 1306, a grid is placed on the webpage. For example, the grid 200 of FIG. 2 is placed over the webpage 102. At 1310, the elements of the webpage are identified. For example, with reference to FIGS. 2 and 3, the elements 108*a-o* of the webpage 102 are identified. It should be appreciated that the elements may include more that just anchor elements. For example, the elements may include static or interactive text, static or animated images, audio, video, radio buttons, search boxes, other textboxes, dropdown menus, forms, etc.

At 1314, the elements are assigned to the nearest cells on the grid. For example, with reference to FIGS. 2-4, each of the elements 108*a-o* are assigned to the cell 204 of the grid 200 that is nearest the element 108. For example, the "All Departments" element 108*a* is assigned to the cell 204*d* because the cell 204*d* is the closest cell to the "All Departments" element 108*a*. Similarly, the "Lap Top 3.0—Order Now" element 108*f* is assigned to cell 204*c* because cell 204*c* is the closest cell to the center of the element 108*f*. Further, as indicated in FIG. 4, because the element 108*f* extends into multiple cells 204, the element 108*f* is assigned to the group of cells 426 within the box 424. As indicated at 1318, hotkeys commands are assigned to the elements. For example, as illustrated in FIGS. 6-11, the "L" key 626 may be assigned to elements 608*i-m* of a search results panel 622, the "T" key 628 may be assigned to the textbox elements 612, the "B" key 1018 may be assigned to the buy box elements 1008*b*, the "R" key 1118 may be assigned to the review elements 1108*b*, etc.

Figure 14:
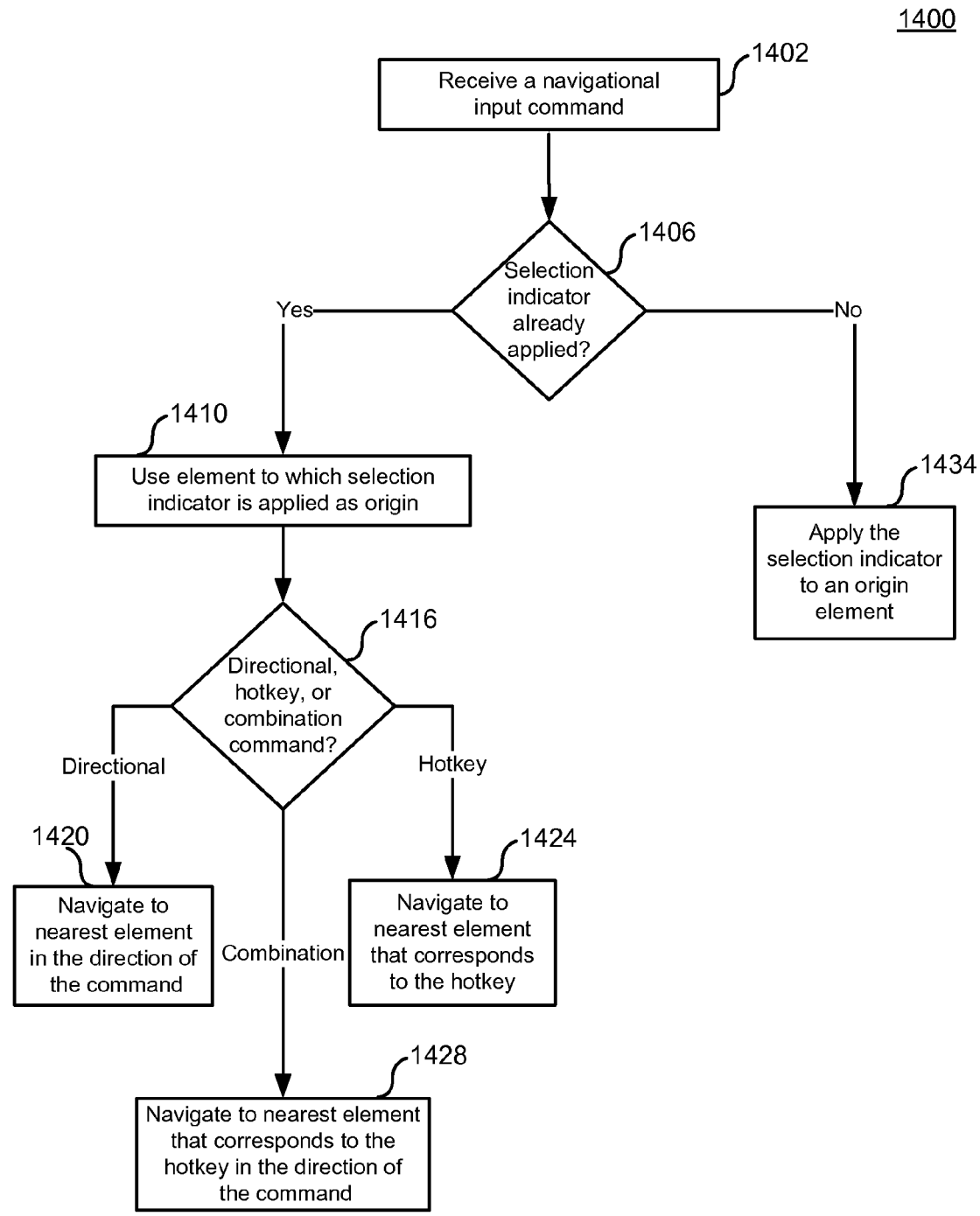
FIG. 14 illustrates an example process of navigating a webpage using a keyboard, in accordance with various embodiments.

FIG. 14 illustrates an example process 1400 of navigating a webpage using a keyboard, in accordance with various embodiments. At 1402, the process 1400 generally begins by receiving a navigational input, such as a directional command or a hotkey command or a combination thereof. For example, a directional command could result from a user pressing one or more of the arrow keys of a keyboard, such as one or more of the arrow keys 402 of keyboard 400 of FIG. 4. Also, for example, the hotkey command could result from a user pressing any one of the keys of a keyboard. An example combination hotkey-directional command is described above with reference to FIG. 8, where a user may hold down the "L" key 626 and then press the directional arrows, such as arrows 630 or 634, to move the selection indicator between the elements 608*i-q* of the list of search results panel 622.

At 1406, the process 1400 involves determining whether a selection indicator is already applied to one of the elements of the webpage. For example, with reference to FIG. 4, upon receiving a navigational command, the process 1400 involves determining whether the selection indicator 420 is applied to one of the elements 108*a-o* of the webpage 102. At 1410, if the selection indicator is already applied to one of the elements of the webpage, the process 1400 involves using the element to which the selection indicator is applied as an origin. For example, referring again to FIG. 400, if, upon receiving a navigational command, the selection indicator 420 is currently being applied to element 108*a*, then the element 108*a* is used as the origin. At 1416, the process involves determining whether the received navigational command is a directional command, a hotkey command, or a combination thereof.

At 1420, if the navigational command is a direction command (e.g., the user pressed one of the arrow keys 402), then the process 1400 involves moving the selection indicator to the element assigned to the nearest cell in the direction of the directional command. For example, as described in more detail above with reference to FIGS. 4 and 5, if the selection indicator 420 is currently on element 108*a* and the directional command is the result of a user pressing the down-arrow key 412, then the selection indicator 420 is moved downward to element 108*b* of cell 204*e*, which is the nearest cell to element 108*a* in the downward direction.

At 1424, if the navigational command is a hotkey command (e.g., the user pressed the "T" key or the "L" key), then the process 1400 involves moving the selection indicator to the element that is assigned to the hotkey and that is assigned to the nearest cell. For example, as described in more detail above with reference to FIGS. 6 and 7, if the selection indicator 620 is currently on element 608*i* and the hotkey command is the result of a user pressing the "L" key 626, then the selection indicator 620 is moved to element 608*j*, which is assigned to the cell nearest the cell to which element 608*i* is assigned.

At 1428, if the navigational command is a directional-hotkey combination command (e.g., the user held down the "L" key and then pressed one of the arrow keys), then the process 1400 involves moving the selection indicator to the element that is assigned to the hotkey and that is assigned to the nearest cell in the direction of the directional component of the command. For example, as described in more detail above with reference to FIG. 8, if the selection indicator 620 is currently on element 608*k* and the directional-hotkey combination command is the result of a user holding down the "L" key and then pressing the right-arrow key 630, then the selection indicator 620 is moved to element 608*p*, which is assigned to the hotkey "L" and which is assigned to the nearest cell in the rightward direction.

Referring again to 1406, if the selection indicator is not already applied to an element of the webpage, then at 1434 the selection indicator is applied to an origin element. For example, if the navigational command is a directional command, such as a command that results from pressing one of the arrow keys 402, then the origin element is considered the element that is located nearest a top-left corner of the grid. With reference to FIG. 4, the top-left corner of grid 200 is indicated at 470. Thus, with reference to FIG. 4, if a directional command is received before the selection indicator 420 has been applied to any of the elements 108*a-o*, then the selection indicator 420 is applied to element 108*a*, which is nearest the top-left corner 470 of grid 200. On the other hand, for example, if the navigational command is a hotkey command or a hotkey-directional combination command, then the origin element is the element that is nearest the top-left corner of the grid and that is assigned to the hotkey.

Figure 15:
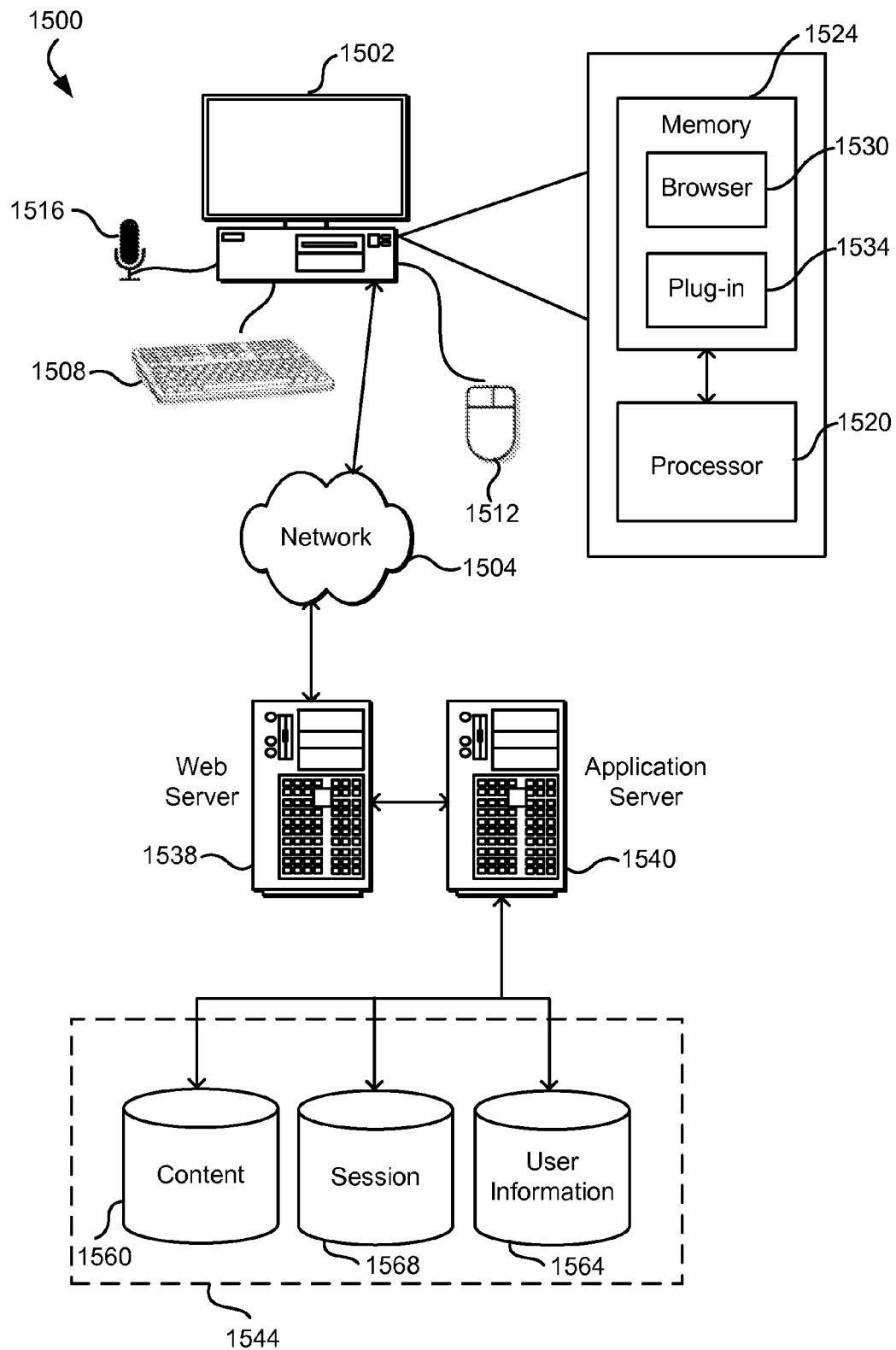
FIG. 15 illustrates an environment in which various embodiments can be implemented.

As discussed, different approaches can be implemented in various environments in accordance with the described embodiments. For example, FIG. 15 illustrates an example of an environment 1500 for implementing aspects in accordance with various embodiments. As will be appreciated, although a Web-based environment is used for purposes of explanation, different environments may be used, as appropriate, to implement various embodiments. The system includes an electronic client device 1502, which can include any appropriate device operable to send and receive requests, messages or information over an appropriate network 1504 and convey information back to a user of the device. The illustrated example device is a desktop computer. However, other examples of such client devices include other types of personal computers, cell phones, handheld messaging devices, laptop computers, set-top boxes, personal data assistants, electronic book readers and the like.

The illustrated client device 1502 includes a keyboard 1508, a pointing device 1512, and a microphone 1516. The client device 1502 may further include a processor 1520 and memory 1524. A web browser application 1530 and a browser plug-in 1534 may be stored in memory 1524. The web browser application 1530 and a browser plug-in 1534 are typically stored as a set of executable instructions in memory 1524. The processor 1520 accesses the memory 1524 to execute the web browser application 1530 and a browser plug-in 1534. The browser plug-in 1534 may be a component of the browser application 1530. The browser application either individually or in combination with the plug-in 1534 and/or other software components and/or applications is capable of executing the steps described herein including the steps indicated with reference to processes 1300 and 1400.

The network 1504 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a web server 1538 for receiving requests and serving content in response thereto, although for other networks, an alternative device serving a similar purpose could be used, as would be apparent to one of ordinary skill in the art.

The illustrative environment includes at least one application server 1540 and a data store 1544. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1540 can include any appropriate hardware and software for integrating with the data store 1544 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the web server 1538 in the form of HTML, XML or another appropriate structured language in this example. The handling of all requests and responses, as well as the delivery of content between the client device 1502 and the application server 1540, can be handled by the web server 1538. It should be understood that the web and application servers are not required and are merely example components, as structured code discussed herein can be executed on any appropriate device or host machine as discussed elsewhere herein.

The data store 1544 can include several separate data tables, databases or other data storage mechanisms and media for storing data relating to a particular aspect. For example, the data store illustrated includes mechanisms for storing content (e.g., production data) 1560 and user information 1564, which can be used to serve content for the production side. The data store is also shown to include a mechanism for storing log or session data 1568. It should be understood that there can be many other aspects that may need to be stored in the data store, such as page image information and access rights information, which can be stored in any of the above listed mechanisms as appropriate or in additional mechanisms in the data store 1544. The data store 1544 is operable, through logic associated therewith, to receive instructions from the application server 1540 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a webpage that the user is able to view via a browser on the user device 1502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing processor-executable instructions for enabling keyboard navigation of a webpage having a plurality of webpage elements, the processor-executable instructions executable by one or more processors to perform a set of operations comprising:
   receiving, at a web browser, a plug-in for the web browser, the web browser configured to display the webpage, the plug-in adapted to be utilized in a plurality of web browsers;
   overlaying, by the plug-in, a grid on the webpage, the grid having a plurality of cells;
   assigning, by the plug-in, each of the plurality of webpage elements to a nearest cell of the grid;
   assigning, by the plug-in, a plurality of hotkey commands to at least one portion of the plurality of webpage elements, wherein the at least one portion of the plurality of webpage elements includes (a) at least two of the plurality of webpage elements that correspond to a first type of webpage element and that are assigned to a same hotkey command and (b) at least one of the plurality of webpage elements that corresponds to a second type of webpage element and that is assigned to a different hotkey command;
   in response to receiving a first directional command from a keyboard, causing to be moved, by the plug-in, a selection indicator to a first webpage element that is assigned to a first cell that is located nearest to the selection indicator in a direction indicated by the directional command;
   in response to receiving a first hotkey command from the keyboard, causing to be moved, by the plug-in, the selection indicator to a second webpage element to which the first hotkey command is assigned and that is assigned to a second cell that is located nearest to the selection indicator; and
   in response to receiving, simultaneously, (a) one of the first directional command or a second directional command and (b) one of the first hotkey command or a second the hotkey command from the keyboard, causing to be moved, by the plug-in, the selection indicator to a third webpage element to which the one of the first hotkey command or the second hotkey command is assigned and that is assigned to a third cell that is located nearest to the selection indicator in a direction indicated by the one of the first directional command or the second directional command.

2. The non-transitory computer-readable storage medium of claim 1, wherein the set of operations further comprises:
   determining, upon receiving the first directional command, the first hotkey command, or the second hotkey command from the keyboard, whether the selection indicator is currently being applied to one of the plurality of webpage elements; and
   causing the selection indicator to be applied to an origin element when the selection indicator is not currently being applied to any of the plurality of webpage elements.

3. The non-transitory computer-readable storage medium of claim 2, wherein when the directional command is received from the keyboard and the selection indicator is not currently being applied to any of the plurality of webpage elements, the origin element is a webpage element that is located nearest a top-left corner of the grid.

4. The non-transitory computer-readable storage medium of claim 2, wherein when the first hotkey command or the second hotkey command is received from the keyboard and the selection indicator is not currently being applied to any of the plurality of webpage elements, the origin element is a webpage element that is located nearest a top-left corner of the grid and that is assigned to the first hotkey command or the second hotkey command.

5. A method of enabling navigation of a webpage containing a plurality of webpage elements, comprising:
under control of one or more computer systems configured with executable instructions,
overlaying a grid on the webpage, the grid having a plurality of cells;
assigning each of the plurality of webpage elements to a nearest cell of the grid, wherein at least two of the plurality of webpage elements correspond to a first type of webpage element and to a same hotkey command, and at least one of the plurality of webpage elements corresponds to a second type of webpage element and to a different hotkey command;
in response to receiving a first hotkey command from a keyboard, causing a selection indicator to be moved to a first webpage element that corresponds to the hotkey command and that is assigned to a first cell that is located nearest to the selection indicator; and
in response to receiving a combination of (a) a directional command and (b) one of the first hotkey command or a second hotkey command from the keyboard, causing the selection indicator to be moved to a second webpage element that corresponds to the one of the first hotkey command or the second hotkey command and that is assigned to a second cell that is located nearest to the selection indicator in a direction corresponding to the directional command.

6. The method of claim 5, further comprising:
assigning a plurality of hotkey commands to at least one portion of the plurality of webpage elements.

7. The method of claim 6, wherein the plurality of webpage elements are HTML elements and the plurality of hotkey commands correspond to the HTML elements.

8. The method of claim 6, further comprising:
in response to receiving a navigational input command, determining whether a selection indicator is applied to one of the plurality of webpage elements.

9. The method of claim 8, further comprising:
when the selection indicator is currently applied to a webpage element from among the plurality of webpage elements and when the navigational input command is one of the directional command or a second directional command, moving the selection indicator to a third webpage element that is assigned to a third cell that is located nearest to the selection indicator in the direction of the one of the directional command or the second directional command.

10. The method of claim 8, further comprising:
when the selection indicator is currently applied to a webpage element from among the plurality of webpage elements and when the navigational input command is a hotkey command, moving the selection indicator to a third webpage element that corresponds to the hotkey command and that is assigned to a third cell that is located nearest to the selection indicator.

11. The method of claim 8, further comprising:
when the selection indicator is currently applied to a webpage element from among the plurality of webpage elements and when the navigational input command is a second combination of (a) one of the directional command or a second directional command and (b) a hotkey command, moving the selection indicator to a third webpage element to which the hotkey command is assigned and that is assigned to a third cell that is located nearest to the selection indicator in the Han direction of the one of the directional command or the second directional command.

12. The method of claim 8, further comprising:
when the selection indicator is not currently applied to a webpage element from among the plurality of webpage elements, applying the selection indicator to an origin element.

13. The method of claim 12, wherein the origin element is the webpage element from among the plurality of webpage elements that is located nearest a top-left corner of the grid.

14. The method of claim 5, wherein the directional command is one of an up-arrow input, an up-left arrow input, an up-right arrow input, a down-arrow input, a down-left arrow input, a down-right arrow input, a left-arrow input, a right arrow input, or a center input.

15. The method of claim 6, wherein the first hotkey command or the second hotkey command is an "R" keystroke and is assigned to one or more of the plurality of webpage elements that are user review elements.

16. A method of enabling navigation of a webpage containing a plurality of webpage elements, comprising:
under control of one or more computer systems configured with executable instructions,
receiving, at a web browser, a plug-in for the web browser, the web browser configured to display at least a portion of the webpage, the plug-in adapted to be utilized in a plurality of web browsers;
overlaying, by the plug-in, a grid on the webpage, the grid having a plurality of cells;
assigning, by the plug-in, each of the plurality of webpage elements to a nearest cell of the grid;
assigning, by the plug-in, a plurality of hotkey commands to at least one portion of the plurality of webpage elements, wherein the at least one portion of the plurality of webpage element include (a) at least two of the plurality of webpage elements that correspond to a first type of webpage element and that are assigned to a same hotkey command and (b) at least one of the plurality of webpage elements that corresponds to a second type of webpage element and that is assigned to a different hotkey command;
in response to receiving a first hotkey command from a keyboard, causing a selection indicator to be moved to a first webpage element to which the hotkey command is assigned and that is assigned to a first cell that is located nearest to the selection indicator; and
in response to receiving, at least substantially simultaneously, (a) a directional command and (b) one of the first hotkey command or a second hotkey command from the keyboard, causing the selection indicator to be moved to a second webpage element to which the one of the first hotkey command or the second hotkey command is assigned and that is assigned to a second cell that is located nearest to the selection indicator in a direction corresponding to the directional command.

17. The method of claim 16, further comprising:
in response to receiving one of the directional command or a second directional command from the keyboard, causing the selection indicator to be moved to a third webpage element that is assigned to a third cell that is located nearest to the selection indicator in a direction specified by the one of the directional command or the second directional command.

18. The method of claim 17, further comprising:
determining, upon receiving the one of the directional command or the second directional command from the keyboard, whether the selection indicator is currently being applied to a webpage element from among the plurality of webpage elements; and
causing the selection indicator to be applied to an origin element of the grid when the selection indicator is not already being applied to any webpage element from among the plurality of webpage elements.

19. The method of claim 18, wherein the origin element is one of the plurality of webpage elements that is located nearest a top-left corner of the grid.

20. A system for enabling navigation of a webpage containing a plurality of webpage elements, the system comprising:
   a processor;
   a microphone; and
   a memory device including instructions operable to be executed by the processor to perform a set of actions, enabling the system to:
      receive, at a web browser, a plug-in for the web browser, the web browser configured to display at least a portion of the webpage, the plug-in adapted to be utilized in a plurality of web browsers;
      overlay, by the plug-in, a grid on the webpage, the grid having a plurality of cells;
      assign, by the plug-in, each of the plurality of webpage elements to a nearest cell of the grid, wherein at least two of the plurality of webpage elements correspond to a first type of webpage element and to a same hotkey command, and at least one of the plurality of webpage elements corresponds to a second type of webpage element and to a different hotkey command;
      in response to receiving a first directional command via the microphone, cause a selection indicator to be moved to a first webpage element that is assigned to a first cell that is located nearest to the selection indicator in a direction indicated by the first directional command;
      in response to receiving a first hotkey command, cause the selection indicator to be moved to a second webpage element that corresponds to the first hotkey command and that is assigned to a second cell that is located nearest to the selection indicator; and
      in response to receiving a combination of (a) one of the first directional command or a second directional command and (b) one of the first hotkey command or a second hotkey command, cause the selection indicator to be moved to a third webpage element that corresponds to the one of the first hotkey command or the second hotkey command and that is assigned to a third cell that is located nearest to the selection indicator in as direction corresponding to the one of the first directional command or the second directional command.

21. The system of claim 20, wherein the memory device includes further instructions, which when executed by the processor, further enable the system to:
   assign a plurality of hotkey commands to at least one portion of the plurality of webpage elements.

22. The system of claim 20 wherein at least one of the first hotkey command, the combination, the second directional command, or the second hotkey command is an audible command that is received via the microphone.

23. The system of claim 20, wherein the memory device includes further instructions, which when executed by the processor, further enable the system to:
   determine, upon receiving the first directional command from the microphone, whether the selection indicator is currently being applied to a webpage element from among the plurality of webpage elements; and
   cause the selection indicator to be applied to an origin element of the grid when the selection indicator is not already being applied to any webpage element from among the plurality of webpage elements.

24. The system of claim 23, wherein the origin element is one of the plurality of webpage elements that is located nearest a top-left corner of the grid.

* * * * *